UNITED STATES PATENT OFFICE.

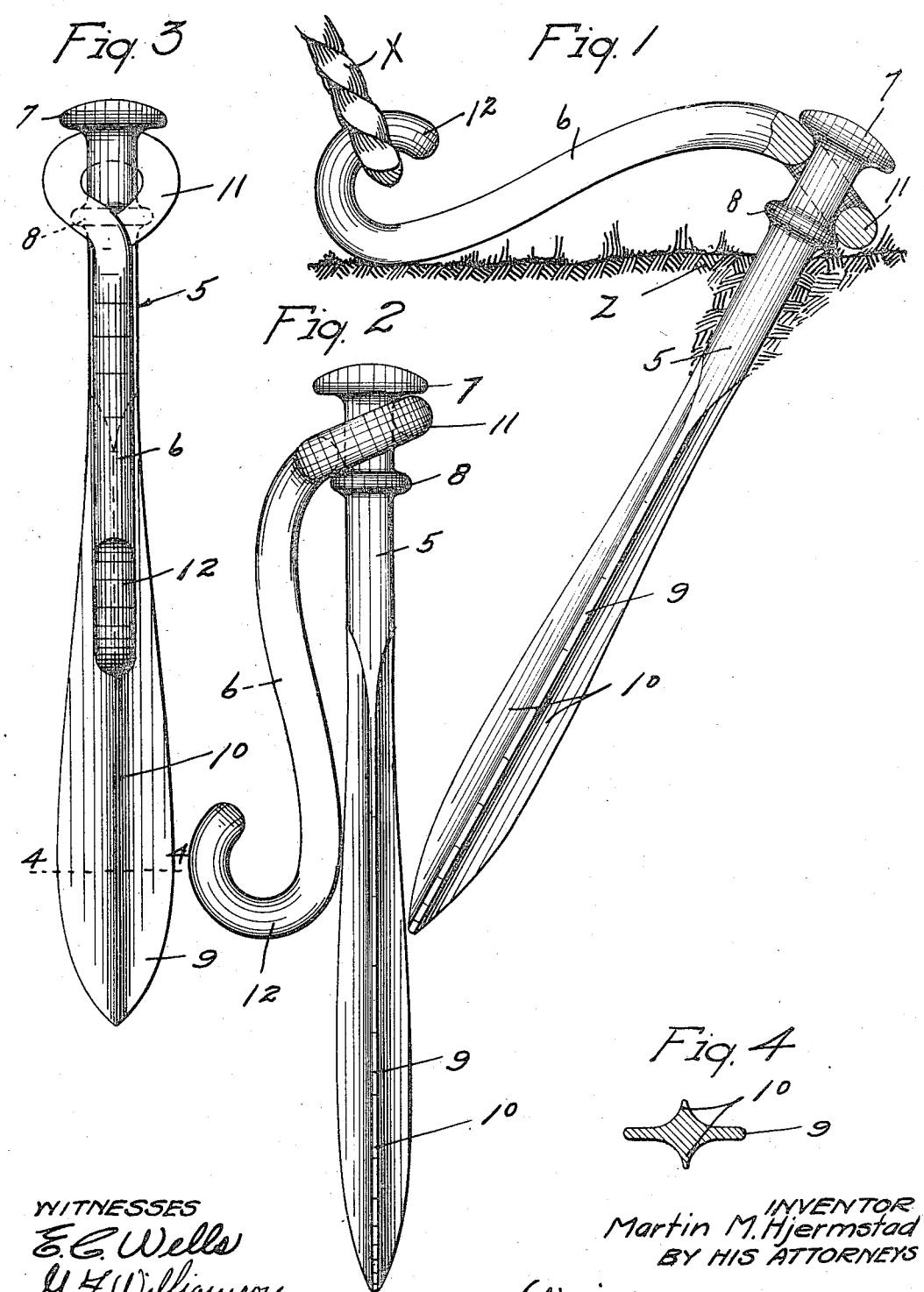
M. M. HJERMSTAD.
ANCHORING DEVICE.
APPLICATION FILED JULY 23, 1917.
1,268,459.
Patented June 4, 1918.
INVENTOR
Martin M. Hjermstad
BY HIS ATTORNEYS
WITNESSES

MARTIN M. HJERMSTAD, OF KENYON, MINNESOTA.

ANCHORING DEVICE.

1,268,459.  Specification of Letters Patent.  Patented June 4, 1918.

Application filed July 23, 1917. Serial No. 182,122.

*To all whom it may concern:*

Be it known that I, MARTIN M. HJERMSTAD, a citizen of the United States, residing at Kenyon, in the county of Goodhue and State of Minnesota, have invented certain new and useful Improvements in Anchoring Devices; and I do hereby declare the following to be a full, clear, and exact description of the invention, such as will enable others skilled in the art to which it appertains to make and use the same.

My invention relates to anchoring devices; and, to this end, it consists of the novel devices and combinations of devices hereinafter described and defined in the claims.

The improved anchoring device is especially adapted for use as a tent stake, and has for its primary object to provide such a stake that is easy to drive into the ground or remove therefrom and, at the same time, securely hold the guy rope of a tent in all kinds of weather, when the stake thereof is driven in various different kinds of soil. The anchoring device is so designed, that when its stake is driven obliquely into the ground in an opposite direction to the pull thereon, the pulling strain of the guy rope will tend to lift the point end of the stake and force its upper end in an opposite direction from said pull, thus securely holding the stake in the ground.

In the accompanying drawings, which illustrate the invention, like characters indicate like parts throughout the several views.

Referring to the drawings,

Figure 1 is a view of the improved anchoring device in side elevation with its stake driven into the ground and having a guy rope attached to the hook end of its link;

Fig. 2 is a side elevation of the invention with the link thereof folded onto the stake;

Fig. 3 is a front elevation of the parts, as shown in Fig. 2; and

Fig. 4 is a transverse section taken on the line 4—4 of Fig. 3.

The improved anchoring device comprises a stake 5 and a link 6. As shown, the stake 5 is formed from a round bar of iron, the upper end of which is upset to form thereon a head 7 and a collar 8, longitudinally spaced, the latter below the former. The lower portion of said bar is flattened to form the body 9 of the stake 5 and, on each face of said body, is formed a central longitudinal rib 10. The lower end of the body 9 and its ribs 10 are pointed, so that the stake 5 will drive more easily.

On one end of the link 6, is an eye 11, which loosely surrounds the stake 5 between its head 7 and collar 8 and swivels said link thereto. The other end of the link 6 is bent to form a hook 12, which extends in a vertical plane. It is important to note that the link 6 is bent upward to hold the eye end thereof downward and thereby bring the eye 11 into a plane that obliquely intersects the body of said link. When the link 6 is in an operative position, its eye 11 also obliquely intersects the stake 5.

In driving the stake 5 into the ground X, the flattened body 9 thereof is positioned to transversely intersect the line of pull that will come thereon, and the top of said stake is kept in an opposite direction from said pull, so that said stake will be positioned, when driven into the ground, as shown in Fig. 1. The stake 5 may be forced into the ground by stepping thereon or by driving the same with a maul or other tool, depending on the condition of the soil. In driving the stake 5, the same is forced into the ground until its collar 8 is substantially at the ground line, thus bringing the lower portion of the eye 11 and the back of the hook 12 substantially into contact with the ground. In this position of the link 6, its eye 11 has a two-point contact with the stake 5 at longitudinally spaced points on opposite sides thereof. In some instances, said contact may be with the head 7 and stake 5, or with the collar 8 and stake 5, but in other instances, said contact may be with the head 7 and collar 8, depending on how loosely the eye 11 engages the stake 5 and the distance the head 7 and collar 8 are spaced apart.

Attached to the hook 12, is a tent guy rope Z which, under the pulling strain thereon, tends to lift the hook end of the link 6 from the ground. This lifting action of the link 6 will, by the engagement of the eye 11 with longitudinally spaced points of contact with the stake 5, tend to force the head end thereof backward and lift the pointed end thereof. The force applied to the stake 5 through the link 6 will tend to force the stake 5 farther into the ground, so that the guy rope Z will be securely held thereby.

The flattened body of the stake 5 greatly assists in holding the stake in the ground and the ribs thereof not only strengthen the stake, but help hold the same against turning movement. The head 7 and collar 8 act as stop shoulders to limit the movement of the eye 11 on the stake 5, under pulling strain, and also prevent the link 6 from being detached from the stake 5. As previously stated, when the stake 5 is driven into the ground, the body of the link 6 is out of contact therewith, thus affording a convenient hand pole by which said stake may be pulled. If the stake 5 cannot be pulled by hand, a bar may be inserted under the link 6 and used as a lever to lift said stake. When the anchoring device is not in use, the obliquely positioned eye 11 permits the link 6 to be folded onto the stake 5, as shown in Figs. 2 and 3, so that the said device may be stored or packed in compact form.

What I claim is:

1. An anchoring device comprising a stake adapted to be driven into the ground and having a pair of longitudinally spaced shoulders, and a link swiveled on the stake between its shoulder for angular movement, whereby the link may be moved from an operative position wherein it engages the two shoulders on opposite sides of the stake to an inoperative position in which the link is folded onto the stake.

2. An anchoring device comprising a stake adapted to be driven into the ground and having a pair of longitudinally spaced shoulders, and a link having at one end an obliquely positioned eye and at its other end a hook, the eye end of the link being swiveled on the stake between its shoulders for angular movement, whereby the link may be moved from an operative position in which its eye is in engagement with the two shoulders on opposite sides of the stake to an inoperative position in which the link is folded onto the stake.

3. An anchoring device comprising a stake adapted to be driven into the ground and having a pair of longitudinally spaced shoulders, and a link swiveled on the stake between its shoulders for angular movement, whereby the link may be moved from an operative position wherein it engages the stake on opposite sides, to an inoperative position in which the link is folded onto the stake, the shoulders on the stake arranged to limit the angular movement of the link thereon.

In testimony whereof I affix my signature in presence of two witnesses.

MARTIN M. HJERMSTAD.

Witnesses:
CLARA DEMAREST,
HARRY D. KILGORE.

Copies of this patent may be obtained for five cents each, by addressing the "Commissioner of Patents, Washington, D. C."